United States Patent
Aldeborg et al.

(10) Patent No.: US 11,097,686 B1
(45) Date of Patent: Aug. 24, 2021

(54) APPARATUS AND SYSTEM FOR ADJUSTABLE SEATBELT GUIDE

(71) Applicant: Volvo Car Corporation, Gothenburg (SE)

(72) Inventors: Gert Aldeborg, Uddevalla (SE); Lars Modh, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/838,090

(22) Filed: Apr. 2, 2020

(51) Int. Cl.
*B60R 22/34* (2006.01)
*B60R 22/18* (2006.01)

(52) U.S. Cl.
CPC .............. *B60R 22/34* (2013.01); *B60R 22/18* (2013.01); *B60R 2022/1818* (2013.01)

(58) Field of Classification Search
CPC ............ B60R 2022/1818; B60R 22/18; B60R 2022/207; B60R 2022/208
USPC ........................................ 297/473, 481, 483
See application file for complete search history.

(56) References Cited

U.S. PATENT DOCUMENTS

| 8,172,327 | B2 | 5/2012 | Lindsay |
| 10,086,792 | B1 | 10/2018 | Watanabe |
| 2003/0020272 | A1* | 1/2003 | Yoshino ................. B60R 22/20 280/808 |
| 2007/0170770 | A1 | 7/2007 | Behrens |
| 2015/0343931 | A1 | 12/2015 | Koike et al. |
| 2019/0176738 | A1 | 6/2019 | Kim et al. |

FOREIGN PATENT DOCUMENTS

| DE | 3909363 A1 * | 5/1990 | ............ B60R 22/20 |
| DE | 3909361 C1 * | 6/1990 | ............ B60R 22/03 |
| DE | 4140237 C1 * | 2/1993 | ............ B60R 22/03 |
| WO | WO-2018029245 A1 * | 2/2018 | ............ B60R 22/48 |

* cited by examiner

*Primary Examiner* — Ruth Ilan
*Assistant Examiner* — Mary E Young
(74) *Attorney, Agent, or Firm* — Clements Bernard Walker; Christopher L. Bernard

(57) ABSTRACT

Apparatus and system for an adjustable seatbelt guide are disclosed. The seatbelt guide is attached to a mechanical stop associated with a seat. The mechanical stop, such as a striker, is adapted to limit reclining movement of a seatback, especially with respect to a rear seat of a vehicle. The mechanical stop and attached seatbelt guide may move positions with or without the seat in order to maintain seatbelt geometry. When the seat is folded down, the seatbelt guide may maintain the seatbelt in the parked position.

19 Claims, 10 Drawing Sheets

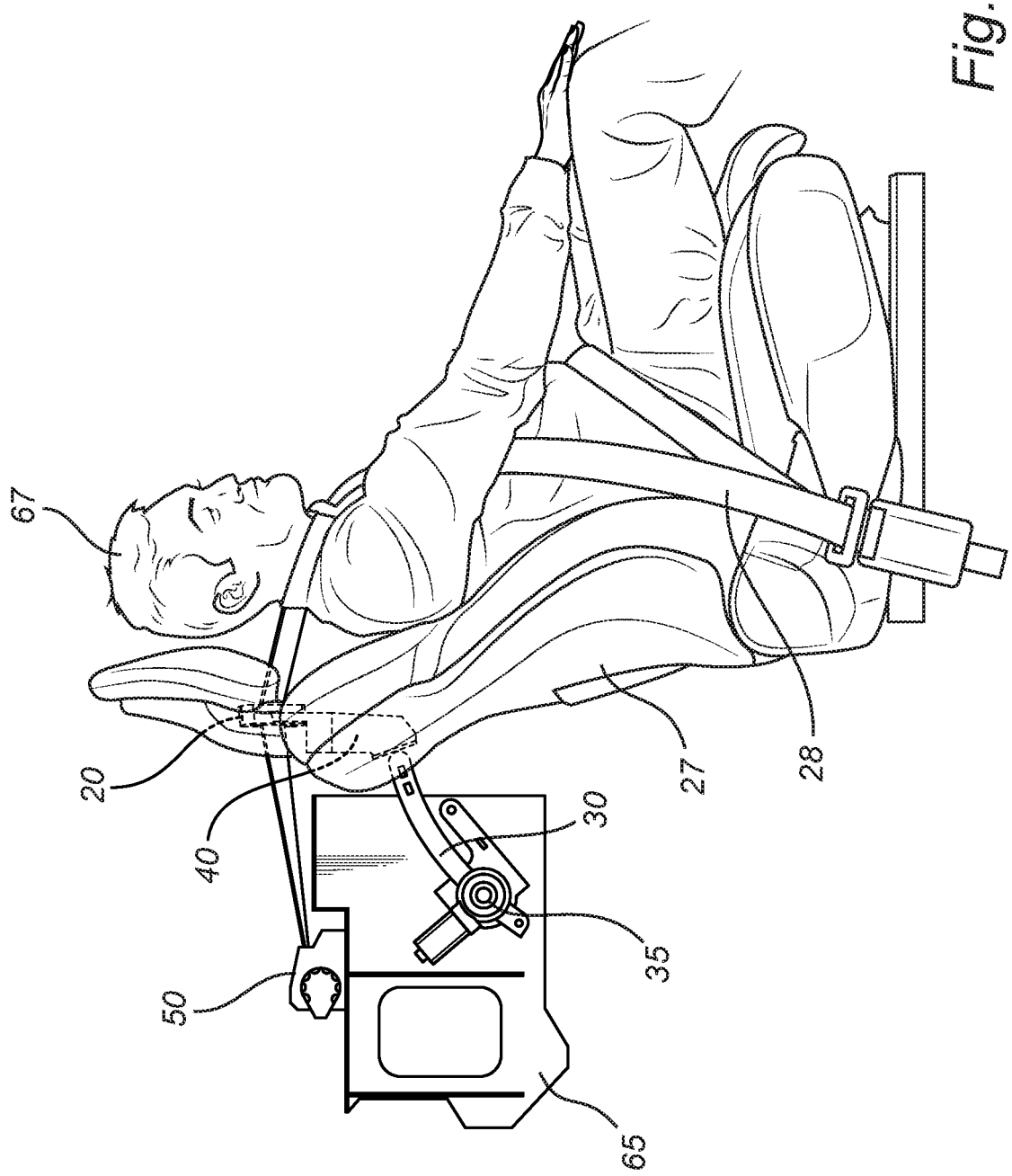

APPARATUS AND SYSTEM FOR ADJUSTABLE SEATBELT GUIDE

TECHNICAL FIELD

The present disclosure relates generally to the automotive and transportation fields. More specifically, the present disclosure relates to seatbelt mechanisms within the automotive and transportation industries.

BACKGROUND

Occupants of vehicles want to be able to recline and position their seats in different positions while maintaining safety and convenience. For example, some vehicle manufacturers are providing rear seats that can recline more. Moreover, autonomous vehicles are envisioned to accommodate seating designs not typical of vehicles used to date. As a result, current seatbelt designs create problems. For example, usually seatbelt webbing is designed to be routed to a retractor mechanism or linkage point (e.g., D-loop) or surface coupled to or embedded within the pillar or body of a vehicle that is off to the side of or behind an occupant. Thus, when an occupant reclines their seat, the seatbelt no longer rests against the occupant's chest and shoulder, because the seatbelt is routed to the pillar. Reclining the seat in this instance creates a gap between the seatbelt and the occupant's chest or further out on the occupant's shoulder that damages seatbelt geometry. Some existing solutions to this problem have been to attach a fixed small guide (e.g. a plastic open loop or hook) to the shoulder on a seat or off to the side on the vehicle body. Thus, when the seat is slightly reclined, the seatbelt is routed from the pillar through the fixed plastic guide maintaining the seatbelt geometry on the occupant's chest. The problem with this solution is that the fixed guide may not be strong enough to withstand an impact force asserted on a seatbelt in a collision in certain seat positions. Another problem with this solution is that the seatbelt will be in the way if an occupant tries to collapse or fold down the seat, because it will be attached to the fixed guide and follow the seat down. Also, as more autonomous vehicles emerge, occupants may want more freedom of positioning in the occupant compartment. For example, a seat may be fully reclined lying flat, and the fixed guide will not solve this problem. Again, it's unlikely the small fixed guide would be able to withstand the forces asserted during an impact. Therefore, there is a need for an adjustable seatbelt guide that solves these problems, adjusting for the recline angle of a vehicle seat, such as a rear seat.

BRIEF SUMMARY OF THE INVENTION

An apparatus and system are described for an adjustable seatbelt guide. The seatbelt guide may "track" the movement of a seat's position in order to maintain seatbelt geometry for seat occupancy applications. For applications where the seat is unoccupied and in a folded or collapsed position, the seatbelt guide may keep the seatbelt out of the way and in the parked position.

In an embodiment, an apparatus is described, including: a seatbelt guide; a mechanical stop; the seatbelt guide attached to the mechanical stop; and the mechanical stop configured to be moveably secure. The seatbelt guide may be located in a position that is convenient and maintains occupant seatbelt geometry. The seatbelt guide may be located offboard from a seatback. The seatbelt guide may be designed in any shape or size appropriate to act as a conduit for the seatbelt webbing to pass through to a retractor. For example, the seatbelt guide may be an oval or rectangular shaped loop positioned outboard from the seatback. The adjustable seatbelt guide may be used for any seat in a vehicle: front, middle, rear, and rear facing. Moreover, any number of adjustable seatbelt guides may be used in a vehicle and more than one may be used for a single seat. Vehicle, herein, is not limited to automobile vehicle, but is broadly interpreted as a means of transportation. Thus, the adjustable seatbelt guide may be used in a train, boat, airplane, etc. The mechanical stop may consist of a single part or multiple parts. In an embodiment, the mechanical stop may include a striker or latch. At least one arm may be included to be a linking member between a motor (or mechanical equivalent) and the mechanical stop. The arm may be any device or combination of devices that links a motor to the mechanical stop such that the motor may directly or indirectly move the mechanical stop up, down, sideways, arced, backwards and forwards.

In another embodiment, an adjustable seatbelt guide system, is described including: a guide, the guide configured to guide a seatbelt webbing; a retractor, the retractor configured to receive the seatbelt webbing; a mechanical stop, the guide attached to the mechanical stop; at least one linking member, the at least one linking member attached to the mechanical stop; and a motor, the motor configured to move the at least one linking member. In an embodiment, the adjustable seatbelt guide may have more than one linking member. For example, the motor may be able to move the mechanical stop forward and backwards using one linking member, and up and down using another linking member. The multiple linking members may consist of separate parts or the same part. For example, a separate vertical linking member may be used in conjunction with a horizontal linking member. The input and control mechanisms to engage and control the motor are envisioned to be numerous. For example, the seat's user adjustment buttons located by the seat may be used. In an embodiment, switches and/or sensors may be used to engage motor. For example, a seat may swivel and touch a mechanical switch that in turn may be used to engage motor. An instrument panel, console, or smart phone button (physical or touch screen) may be pressed to engage motor. The retractor may be attached to the motor, the mechanical stop, or the vehicle body. In an embodiment, the retractor is attached to the mechanical stop and "tracks" with a seatback. The motor may be any electrical DC/AC motor (or mechanical equivalent). In an embodiment, mechanical stop may be a striker or a latch.

In a further embodiment, a device for adjustable seatbelt guide, is described, including a seatbelt guide; and a striker, the seatbelt guide attached to the striker, the striker configured to be moveably secure. In an embodiment, the device may further include a motor, the motor configured to move the striker; an arm; and the seatbelt guide and/or a seatbelt retractor. FIG. 5 illustrates a detailed embodiment of an adjustable seatbelt guide system, but many different mechanical implementations may be used and are envisioned within the scope of the disclosed embodiments. For example, the FIG. 5 embodiment for a mechanical stop may be configured differently (shape, size, attachments, materials, etc.), but provide the same functionality. For example, mechanical stop may be a vertical or horizontally positioned metal loop configured to attach to a corresponding latch. In conjunction, a motor is described in various embodiments, but the equivalent functionality may be provided manually (not by an electric motor). In an embodiment, the striker may be attached to the arm. In an embodiment, the striker may be part of the same device or part as the arm (e.g. a striker that inherently includes an arm). In an embodiment, a rear seat may utilize the device for adjustable striker and, secondarily, seatbelt guide. In another embodiment, a front, middle, or rear facing seat may utilize the device for adjustable seatbelt guide.

BRIEF DESCRIPTION OF THE DRAWINGS

The following embodiments may be better understood by referring to the following figures. The figures are presented for illustration purposes only, and may not be drawn to scale or show every feature, orientation, or detail of the embodiments. They are simplified to help one of skill in the art understand the embodiments readily, and should not be considered limiting.

FIG. 7B. illustrates another rear seat view of an adjustable seatbelt guide in an embodiment;

DESCRIPTION OF EXEMPLARY EMBODIMENTS

Each of the additional features and teachings disclosed below can be utilized separately or in conjunction with other features and teachings to provide an apparatus and system for an adjustable seatbelt guide. Representative examples of the following embodiments will now be described in further detail with reference to the attached drawings. This detailed description is merely intended to teach a person of skill in the art details for practicing the preferred aspects of the teachings and is not intended to limit the scope of the embodiments. In the present disclosure, features may be described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features. Described are various embodiments in which a seatbelt guide is movable in relation to a vehicle's seat movement, thus, maintaining seatbelt geometry while not being attached to the seat itself. In an embodiment, the seatbelt guide may be attached to the seat's mechanical stop limit. Seatbelt, herein, broadly may refer to parts of the seatbelt assembly, the belt or webbing.

Figure 1:
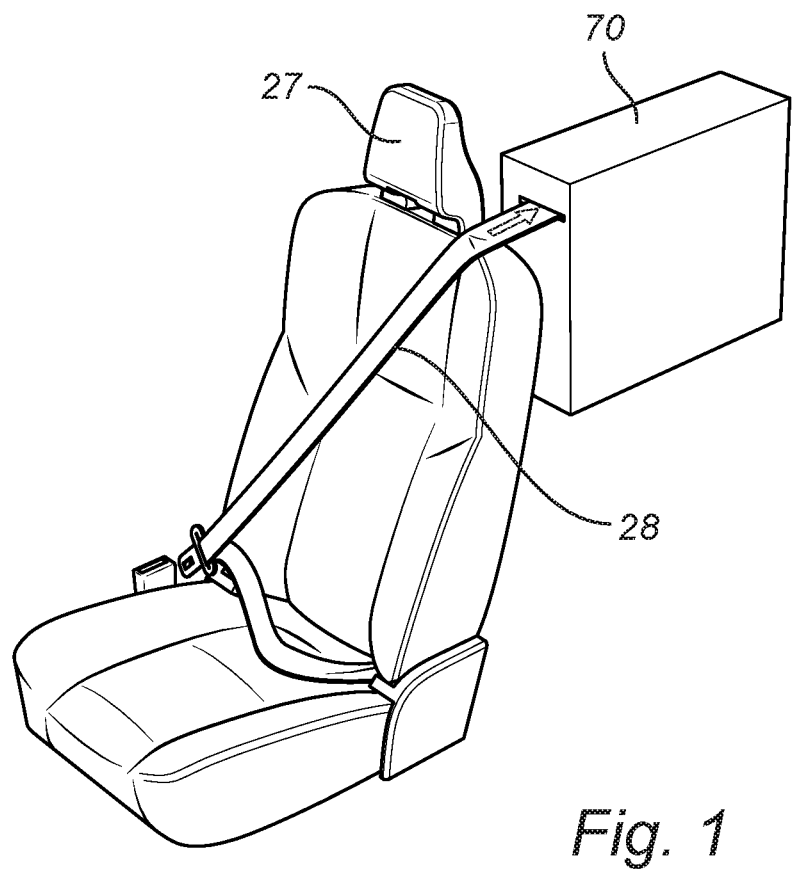
FIG. 1. illustrates an adjustable seatbelt guide system in an embodiment.

FIG. 1 illustrates an adjustable seatbelt guide system 70 in an embodiment. The adjustable seatbelt guide system 70 may include an adjustable seatbelt apparatus or device. Exemplarily, seatback 27 is shown in an upright position. Seatbelt 28 feeds into the adjustable seatbelt guide system 70. Adjustable seatbelt guide system 70 may be located behind, off to a side (e.g. outboard) of, or any combination thereof, in relation to seatback 27. Adjustable seatbelt guide system 70 may be configured to allow the seatback 27 to recline while maintaining passenger seatbelt geometry. Adjustable seatbelt guide system 70 may be configured to allow a seat to be folded or collapsed while keeping the seatbelt in a parked position 31. Thus, conveniently out of a user's way.

Figure 2:
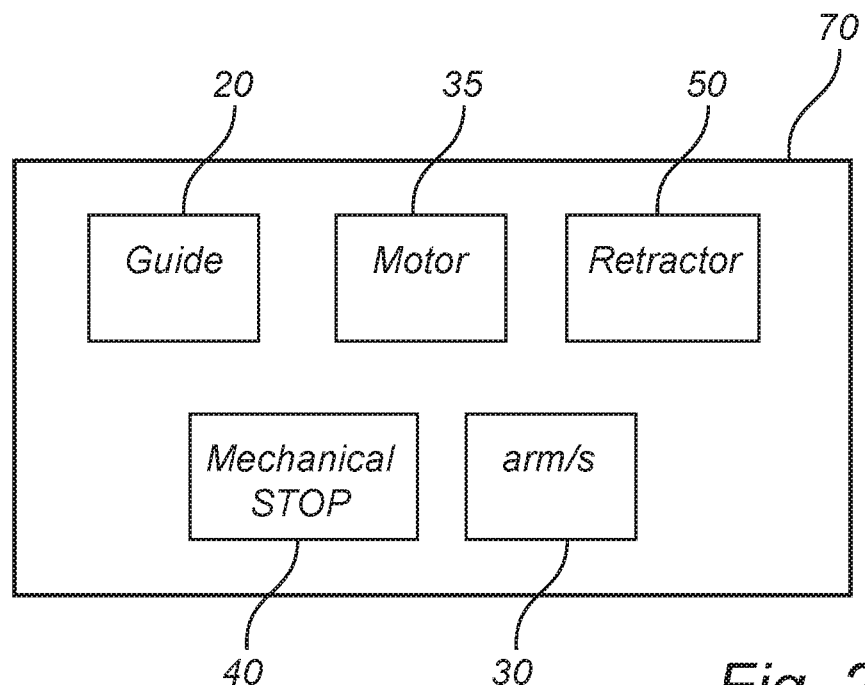
FIG. 2. illustrates an adjustable seatbelt guide system block diagram in an embodiment.

FIG. 2 illustrates an adjustable seatbelt guide system 70 block diagram in an embodiment. The adjustable seatbelt guide system 70 may include an adjustable seatbelt apparatus or device. Adjustable seatbelt guide system 70 may include a guide 20. Guide 20 may be shaped and sized to act as a conduit (i.e., guide) for the seatbelt webbing. Guide 20 may be attached to a mechanical stop 40 or arm 30. Attached, herein, meaning joined or connected to, but may be in a linking, indirect or direct manner, and may be attached internally or externally. Adjustable seatbelt guide system 70 may include a seatbelt retractor 50. Guide 20 may function to guide seatbelt 28 through to retractor 50. Retractor 50 may allow the seatbelt webbing to wind up, be let out, clutched during an impact, etc., as is well known in the art. Retractor 50 may be attached to the body of the vehicle or in another appropriate mechanical place. In an embodiment, retractor is attached to mechanical stop 40. In an embodiment, mechanical stop 40 may be constructed from one part or device. In an embodiment, mechanical stop 40 may be constructed from multiple devices or parts. Mechanical stop 40 may include the same part as arm/s 30 or not (the two functions are comprised in a single part). Arm/s 30 may be constructed form one or more parts. In an embodiment, arm/s 30 may be attached to guide 20. In an embodiment, arm/s 30 may be attached to mechanical stop 40. Mechanical stop 40 may be a striker, or a mechanical device that limits the movement of a seatback or seat component in a given direction. For example, seatback 27 in FIG. 1 may be configured to recline backwards until it reaches mechanical stop 40. Mechanical stop 40 may be a variety latching mechanisms that secures a seatback in position. Mechanical stop may be configured to latch to a corresponding part on a seatback. Mechanical stop may be a latch or latching mechanism that is configured to latch to a corresponding striker on a seatback. Mechanical stop 40 may be attached to guide 20 and one or more arms 30. Arm/s 30 may enable the vertical, arced, or horizontal movement of mechanical stop 40 (inversely guide 20). Arm/s 30 may act as a mechanical linking member and may be a rod, threaded rod, linking member, ratchet, plate, a geared or edged member, or any equivalent mechanical functioning device/s that allows motor 35 (or manual equivalent mechanism) to move and lock the mechanical stop 40 in place. Arm/s 30 may be moved by means of motor 35 or an equivalent manual (non-electric) mechanism. The mechanical stop 40, guide 20, retractor 50, or arm/s 30 may be configured to be movably secure. In other words, they may move in order to track the movement of a seat, but be secured in place for operation. Motor 35 may be attached to the body of the vehicle, or other appropriate mechanical place. Motor 35 may move arm/s 30 which in turn (indirectly) may move mechanical stop 40 or guide 20. In an embodiment, motor 35 may be configured to move mechanical stop 40 downwards, upwards, backwards, forwards, sideways, arced, or any combinations thereof. In another embodiment, motor 35 may be configured to move the mechanical stop 40 forward and backwards. In an embodiment, motor 35 may be configured to move mechanical stop 40 downwards and upwards. In an embodiment, motor 35 may be configured to move mechanical stop 40 in a sideways and/or arced direction.

Motor 35 may be configured in a variety of ways to move guide 20 (e.g. via mechanical stop 40, or via arm/s 30). For example, the seat's user adjustment buttons located by the seat may be used. In an embodiment, switches and/or sensors may be used to engage and/or as control inputs for motor 35. For example, a seat may swivel and touch a mechanical switch that in turn may be used as an input to engage motor 35. A dashboard or smart phone button (physical or touch screen) may be pressed to engage motor 35. For example, a user may touch an option from a menu on a dashboard touch screen which may be used to control motor 35. A rear seat may have a pop-up console that a user may touch which may in turn be used as inputs to control the motor 35. Many iterations of inputs are envisioned and meant to be within the scope of the disclosure.

Figure 3:
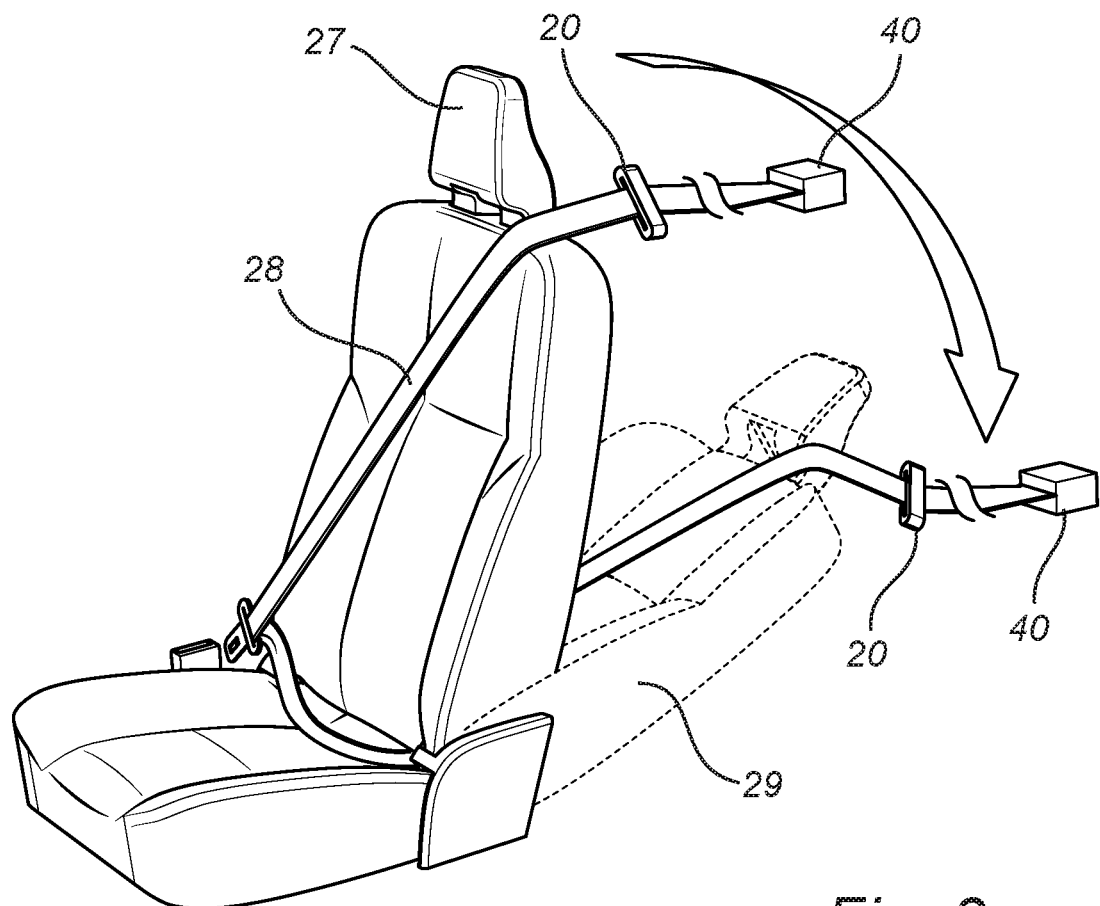
FIG. 3. illustrates a seatback in a reclined position in an embodiment.

FIG. 3 illustrates a seatback in a reclined position 29 in an embodiment.

Seatback 27 is shown in a reclined position 29. An apparatus or device for an adjustable seatbelt guide is shown. Guide 20 is attached to mechanical stop 40. In an embodiment, motor 35 may move mechanical stop 40 or guide 20 backwards to recline enabling the seatback 27 to be limited by the mechanical stop 40 while maintaining seatbelt geometry, because guide 20 is attached to mechanical stop 40 and not the seat. In an embodiment, a rear seat that traditionally may not be allowed to recline much, may utilize an adjustable seatbelt guide apparatus or device.

Figure 4:
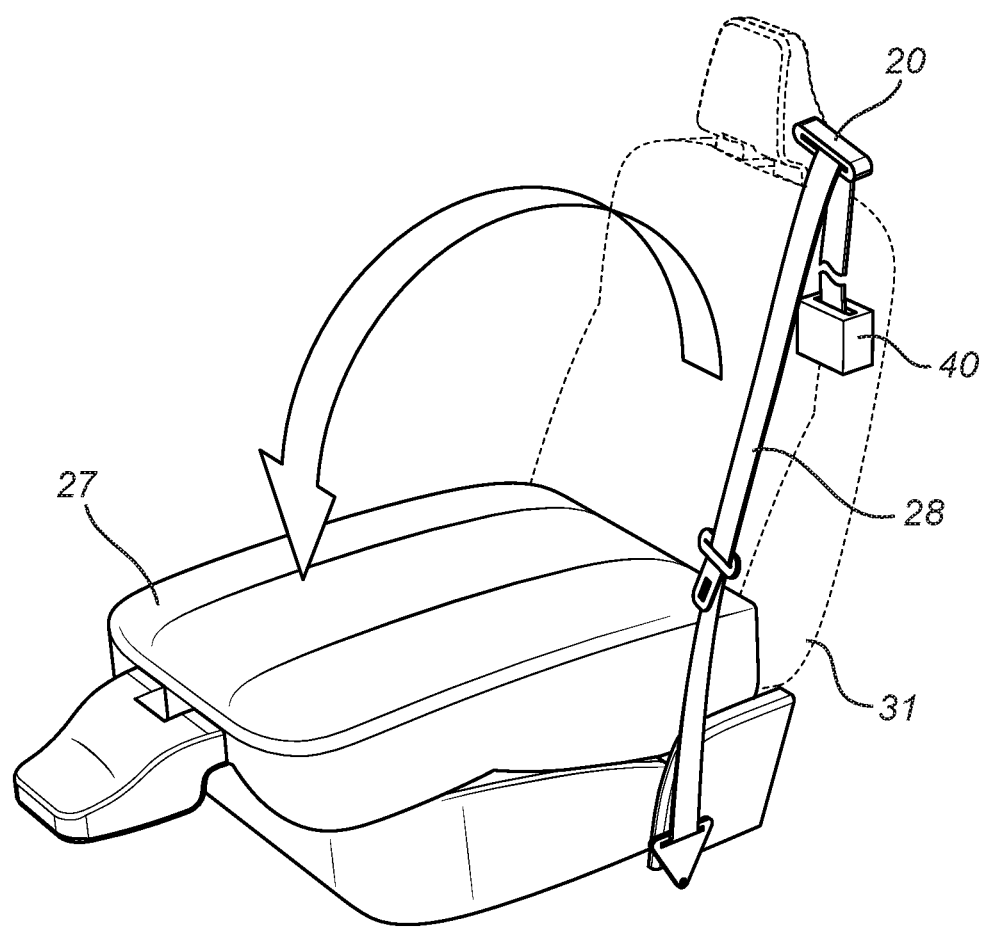
FIG. 4. illustrates seatback in a folded position in an embodiment.

FIG. 4 illustrates seatback 27 in a folded position in an embodiment. An apparatus or device for an adjustable seatbelt guide is shown. Seatbelt 28 is not in the way of the folded seat, because guide 20 is not attached to the seat. Thus, the seat may be conveniently folded or collapsed without the inconvenience of the seatbelt in the way. Adjustable seatbelt guide system 70 may maintain the seatbelt 28 in the parked position 31 while the seat is folded down.

Figure 5:
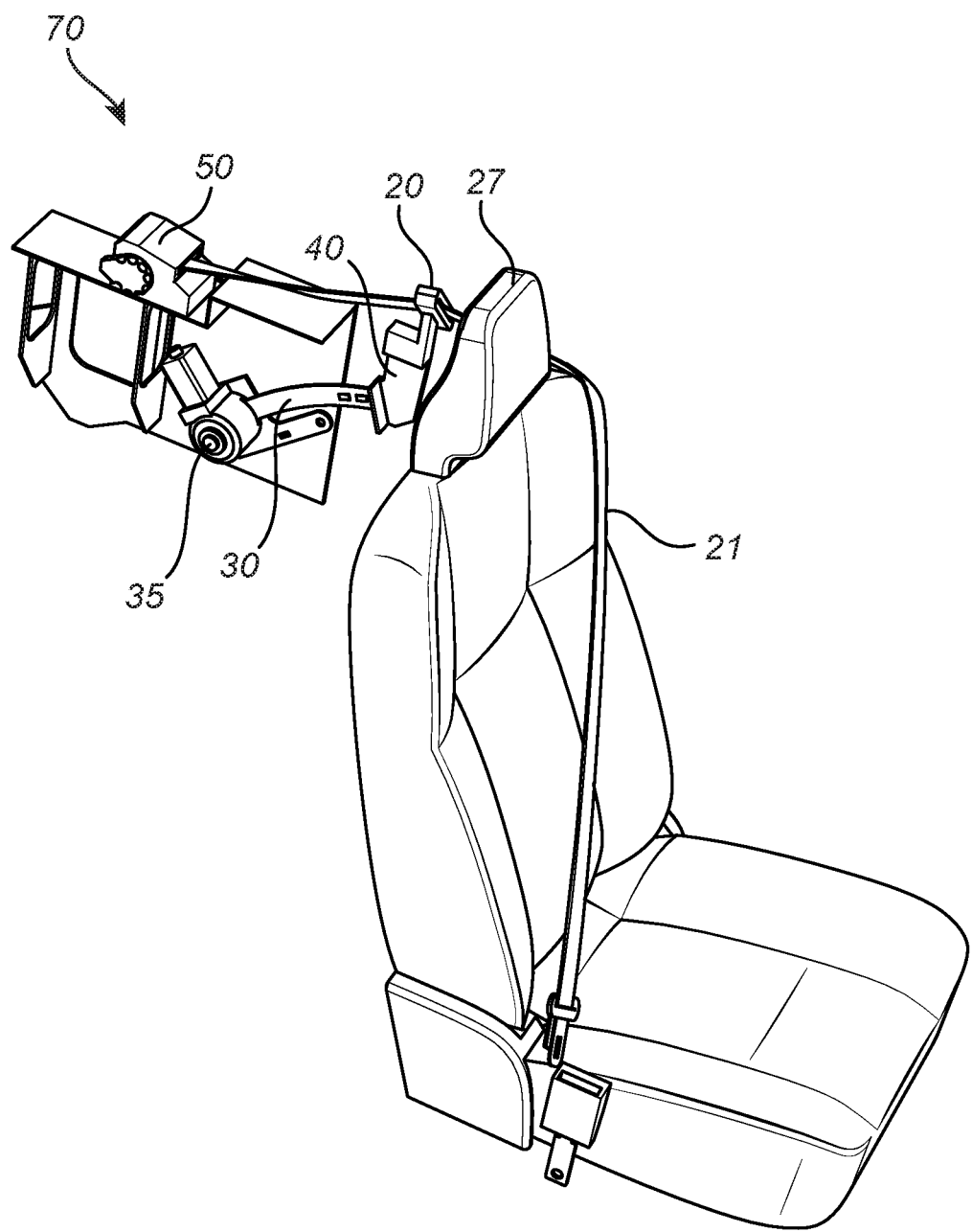
FIG. 5. illustrates an embodiment of an adjustable seatbelt guide system.

FIG. 5 illustrates an embodiment of an adjustable seatbelt guide system 70. The adjustable seatbelt guide system 70 may include an adjustable seatbelt apparatus or device. Guide 20 is configured as a flattened loop allowing seatbelt 28 to pass through it to be connected to retractor 50. Retractor 50 is well known in the art and may be attached to the body of the vehicle, to an appropriate part of the vehicle, to motor 35, or to mechanical stop 40. Mechanical stop 40 may be attached to guide 20. Mechanical stop 40 (and indirectly guide 20) may be moved, or guide 20 (and indirectly mechanical stop 40) may be moved to allow the seatback to be in a variety of different positions. Because guide 20 is attached to mechanical stop 40 and not the seat, guide 20 may then track with the seat's position to maintain seatbelt geometry. Seatback 27 may be secured by mechanical stop 40. Motor 35 (or a manual mechanical equivalent) may move one or more arm/s 30 to consequently move mechanical stop 40 or guide 20.

Figure 6:
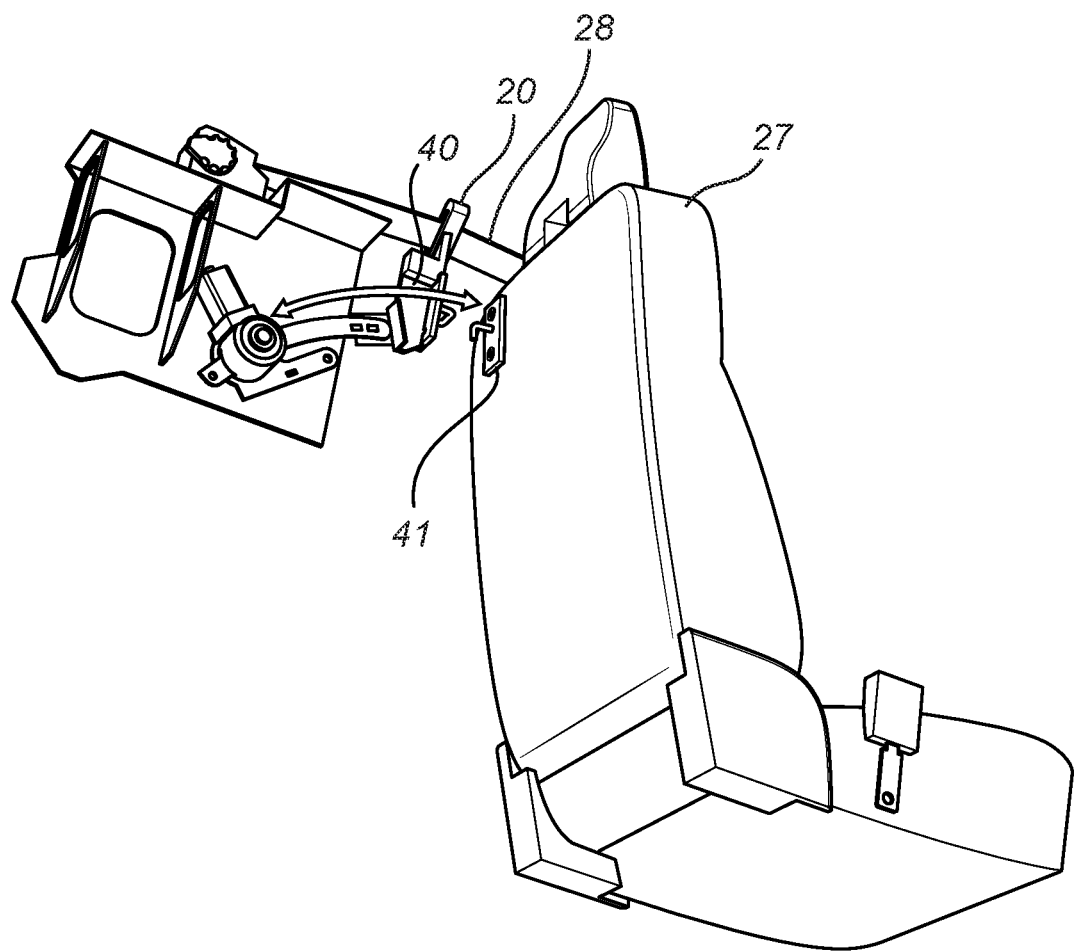
FIG. 6. illustrates a rear seat configuration of an adjustable seatbelt guide in an embodiment.

FIG. 6 illustrates a rear seat configuration of an adjustable seatbelt guide 70 in an embodiment. The adjustable seatbelt guide system 70 may include an adjustable seatbelt apparatus or device. Typical rear seats use a seatback striker/latch mechanism to secure the seatback in place. Strikers and their corresponding latching mechanisms vary and come in multiple shapes, positions, configurations, and combinations. A striker may be in the form of a metal loop that is positioned vertically or horizontally and attached to the body of the vehicle. For example, the "loop" may be located on the vehicle interior side and configured to receive a corresponding latch located in the seatback's side, middle, or upper quadrant. In some embodiments, the latch mechanism may be located on the vehicle body and the striker located in the seatback. A horizontal loop striker 40 is shown for simplicity, but any type of striker and latching mechanisms may be used in the disclosed embodiments. In this example, guide 20 is shown attached to striker 40. Guide 20 and striker 40 may not be attached to the seatback. In this example, striker 40 may be used as a mechanical stop. Exemplary, latching mechanism 41 is shown as a latch attached to the seatback. It will be apparent to a person of ordinary skill in the art (POSA), that traditional rear seats may not allow the seatback 27 to recline that much as the striker mechanisms latch them fairly upright. As described in the embodiments, mechanical stop 40 shown as a loop striker in this example and attached guide 20 are adjustable and may allow a rear seat to recline more while maintaining seatbelt geometry.

Figure 7A:
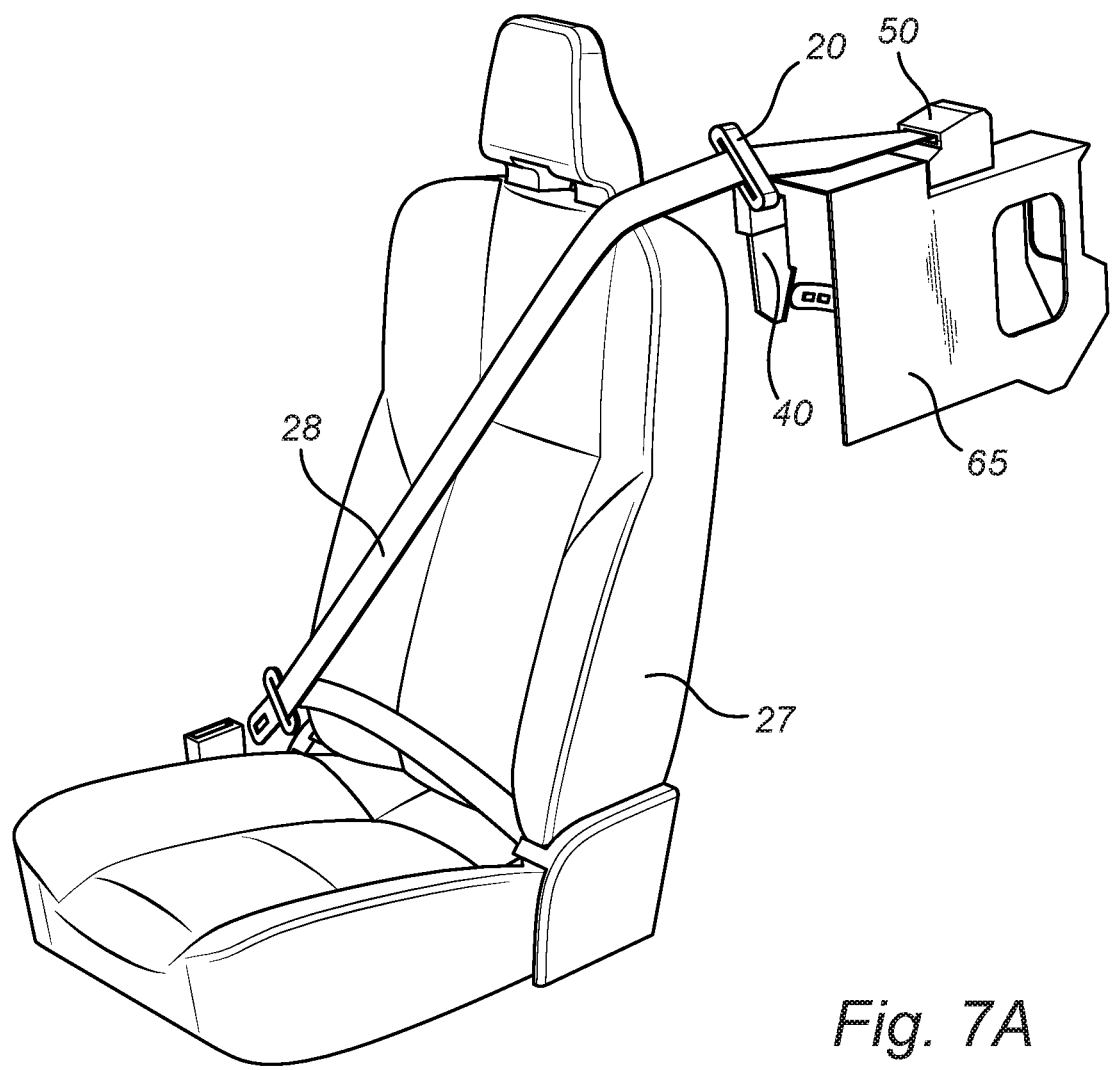
FIG. 7A. illustrates a rear seat view of an adjustable seatbelt guide in an embodiment.

FIG. 7A illustrates a rear seat view of an adjustable seatbelt guide 70 in an embodiment. The adjustable seatbelt guide system 70 may include an adjustable seatbelt apparatus or device. Rear seatback 27 is shown here in a fairly upright position, but may recline more fully (not shown). Seatbelt 28 may be passed through guide 20 and attached to retractor 50. Motor 35, not shown, may be attached to the vehicle body 65. Retractor 50 may be attached to the motor 35 or the vehicle body 65. In an embodiment, retractor 50 may be attached to the guide 20 and/or mechanical stop 40 and movably secure. Mechanical stop 40 may be a type of striker. Arm/s 30, not shown, may be moved by motor 35, which in turn may move mechanical stop 40 and/or guide 20. Seatback 27 may be latched into place with mechanical stop 40. Seatback 27 may be able to recline and be latched into place by mechanical stop 40 as mechanical stop 40 and guide 20 move.

FIG. 7B illustrates another rear seat view of an adjustable seatbelt guide 70 in an embodiment. The adjustable seatbelt guide system 70 may include an adjustable seatbelt apparatus or device. Mechanical stop 40 is shown latched to seatback 27. Guide 20 may be located offboard seatback 27 and configured to maintain seatbelt geometry for occupant 67. Occupant 67 may recline seatback 27 via user seat adjustment buttons or on digital console/menu located near the seat. Retractor may be attached to the motor 35, the vehicle body 65, mechanical stop 40, or the arm/s 30. Retractor may move in correspondence to the mechanical stop 40 moving or be attached in non-movable manner depending on the desired seat configurations. For example, the exemplary swivel seat configurations shown in FIGS. 6A and 6B may have the retractor 50 movable with the mechanical stop 40 and guide 20.

Figure 8A:
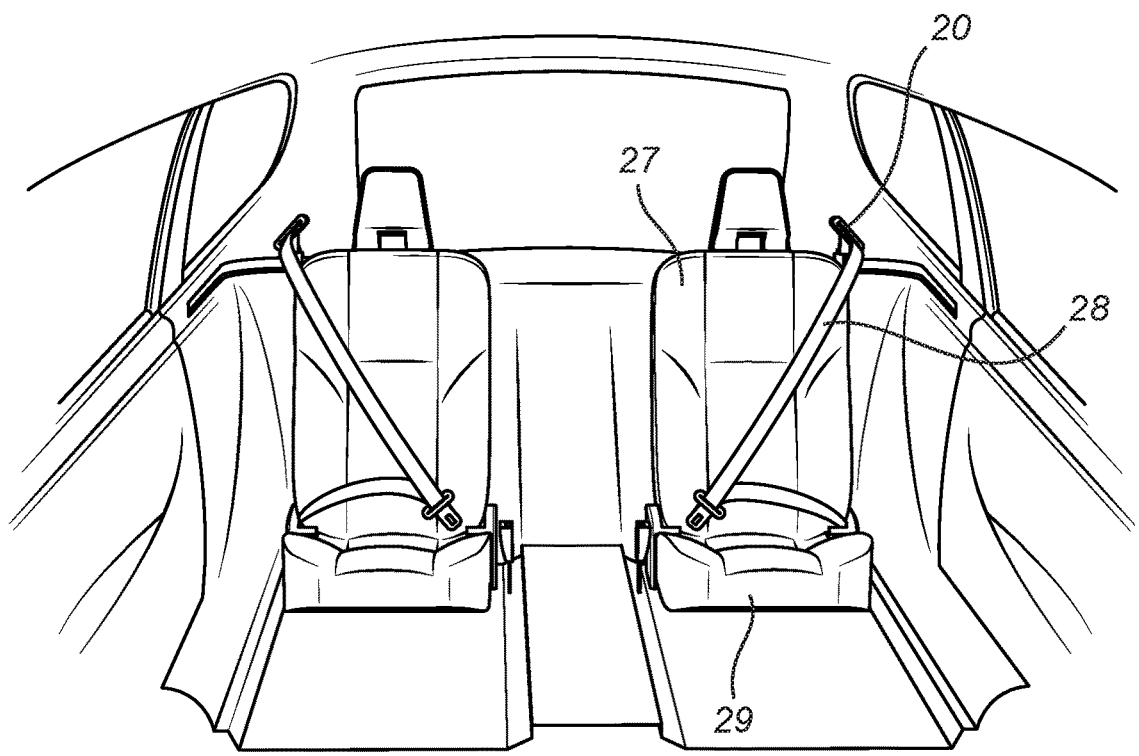
FIG. 8A. illustrates a front seat in an embodiment of an adjustable seatbelt guide system.

FIG. 8A illustrates a front seat in an embodiment of an adjustable seatbelt guide 70 system. The adjustable seatbelt guide system 70 may include an adjustable seatbelt apparatus or device. Seatback 27 is shown facing away from the front windscreen of the vehicle. Seat 29 may be configured to swivel. Adjustable seatbelt guide system 70 may be located behind, on the pillar, or side of the body of the vehicle as described in the various embodiments. Adjustable seatbelt guide system 70 may be configured to allow the mechanical stop 40 used to arrest reclination of the seatback 27 (and/or consequently guide 20) to move sideways or in an arced direction to track the seat's swivel movement. Mechanical stop 40 may thus be configured to limit the seatback's 27 motion backwards. In an embodiment, mechanical stop 40 may latch the seatback 27 in place in a reclining (forward and backward direction) and in a swiveling (arced) direction. Mechanical stop 40 and guide 20 may be configured to move with and secure the seatback 27.

Figure 8B:
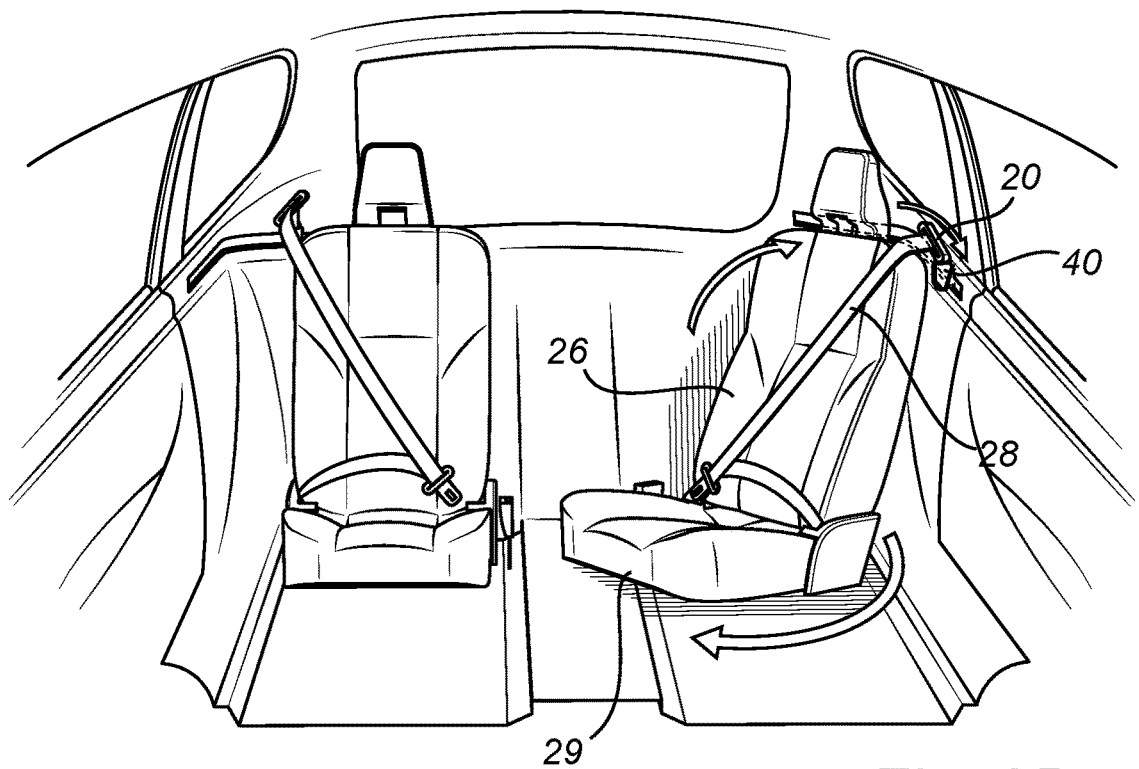
FIG. 8B. illustrates a swiveled facing seat in an embodiment of an adjustable seatbelt guide system.

FIG. 8B illustrates a swiveled facing seat in an embodiment of an adjustable seatbelt guide 70 system. The adjustable seatbelt guide system 70 may include an adjustable seatbelt apparatus or device. Seat bottom 29 may swivel and lock into a new position. Mechanical stop 40 may move sideways or arced and provide a mechanical stop for seatback 27. Other strikers or mechanical stops may be used in conjunction with the seat bottom. Guide 20 may be moved sideways (or arced) as well as backwards and forwards to maintain seatbelt geometry when a seat rotates and/or reclines. The seats utilizing an adjustable seatbelt guide 70 may be front, rear, rear facing, or middle seats.

Figure 9:
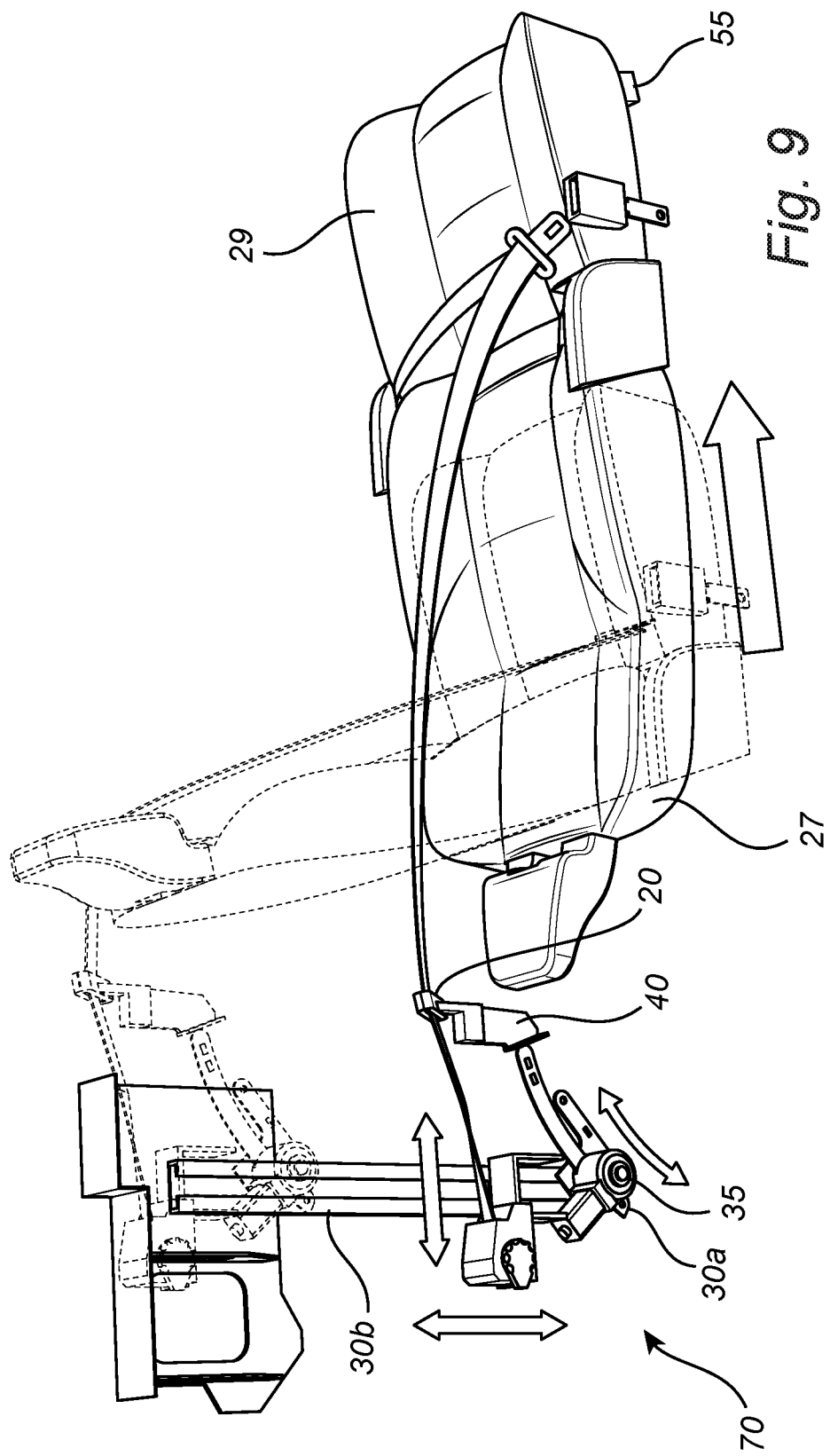
FIG. 9. illustrates a seatback lying "flat" in an embodiment of an adjustable seatbelt guide system.

FIG. 9 illustrates a seatback lying "flat" in an embodiment of an adjustable seatbelt guide system 70. The adjustable seatbelt guide system 70 may include an adjustable seatbelt apparatus or device. Seatback 27 may be a front, rear, rear facing, or middle seat. Seatback 27 may have been upright with an adjustable seatbelt guide 70 as described. Seatback 27 may then lay flat from an upright position as shown. Seat bottom 29 may slide forward and lock into another place as seatback 27 lays down flat. Adjustable seatbelt guide 70 may move guide 20, mechanical stop 40, and/or retractor 50 in order to track with the seatback 27. In an embodiment, motor 35 may move the mechanical stop 40 and/or arm 30a up and down on arm 30b. Arm 30b may be a vertical arm/linking member. Thus, if an occupant wants to "lay down" or fully recline in their seat, the seatbelt may track with the seat to maintain seatbelt geometry providing a mechanical stop to secure the seatback in position. Typical fully reclining seats use mechanical latching mechanisms and seatbelt retractors within the seat itself. Advantages to the disclosed embodiments, may be that the adjustable seatback guide 70 used in a fully reclining seat position may provide more safety during an impact situation.

Figure 10:
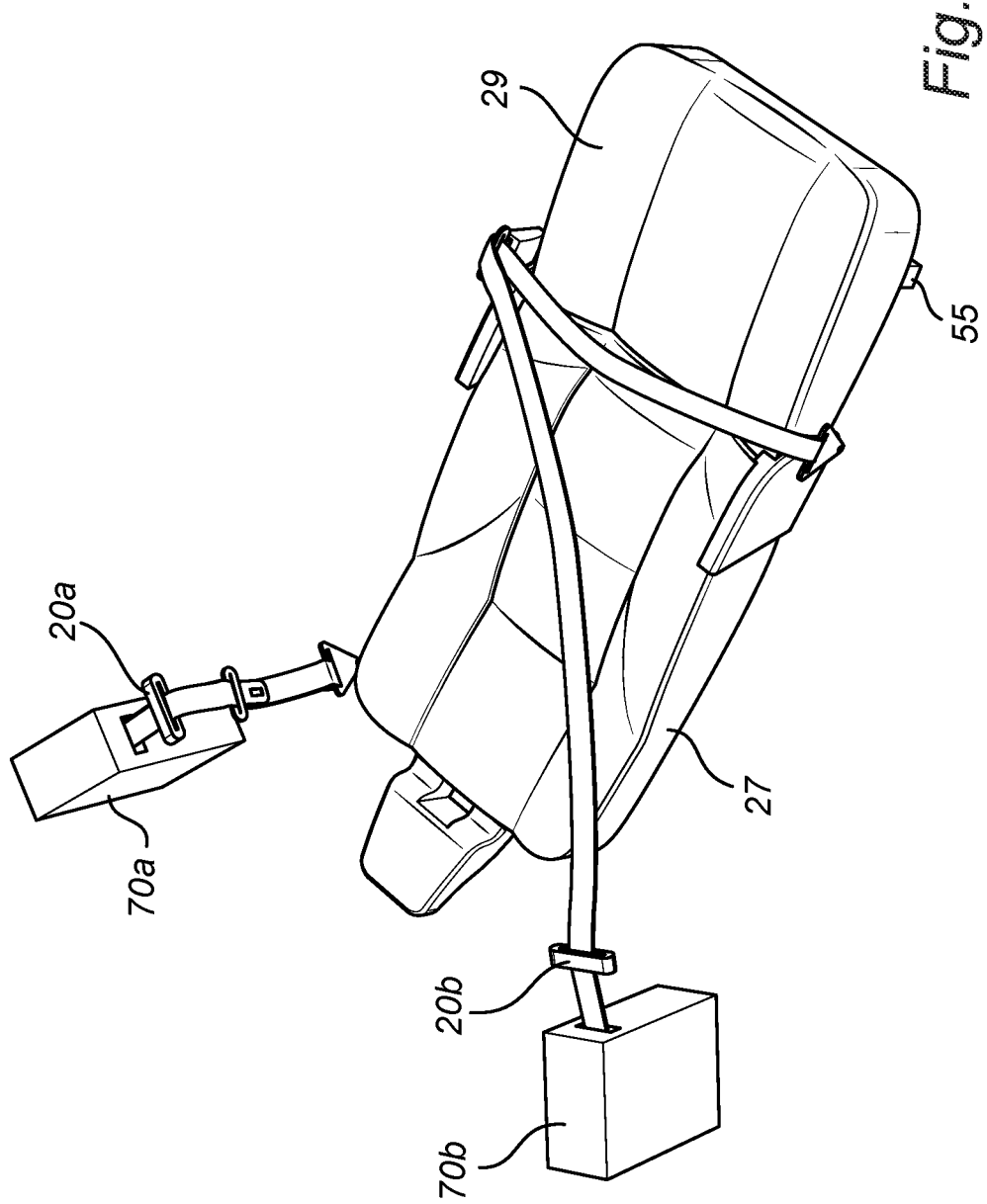
FIG. 10. illustrates an embodiment of an adjustable seatbelt guide system with a seatback lying "flat."

FIG. 10 illustrates an embodiment of an adjustable seatbelt guide system 70a with a seatback lying "flat," with the mechanical stop 40 and therefore the seatbelt guide 70 "fully" deployed. The adjustable seatbelt guide system 70 may include an adjustable seatbelt apparatus or device. There may be more than one adjustable seatbelt guide systems deployed in a vehicle, and more than one adjustable seatbelt guide systems used per seat. For example, adjustable seatbelt guide system 70a may be used when the seatback is in an upright and folded position, while adjustable seatbelt guide system 70b may be used when the seatback is in a lying down (e.g. fully reclined) position. Adjustable seatbelt guide systems 70a and 70b may then provide different seatbelts as guided through guides 20a and 20b. Adjustable seatbelt guide systems may be used for front, middle, rear facing, or rear seats. In other words, any seat that may benefit from an adjustable seatbelt guide system, or multiple instances of an adjustable seatbelt guide 70 system may use the disclosed embodiments. Other strikers or latching mechanisms 55 may be used in conjunction with adjustable seatbelt guide.

The described embodiments or any part(s) or function(s) thereof, may be implemented using hardware, software, or a combination thereof. Reference to an element in the singular is not intended to mean "one and only one" unless explicitly so stated, but rather means "one or more." No claim element herein is to be construed under the provisions of 35 U.S.C. Sec. 112, sixth paragraph, unless the element is expressly recited using the phrase "means for . . . "

In addition, the conjunction "and" when used in the claims is meant to be interpreted as follows: "X, Y and Z" means it can be either X, Y or Z individually, or it can be both X and Y together, both X and Z together, both Y and Z together, or all of X, Y, and Z together.

It should be understood that the figures illustrated in the attachments, which highlight the functionality and advantages of the described embodiments, are presented for example purposes only. The architecture of the described embodiments are sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the described embodiments in any way. It is also to be understood that the steps and processes recited in the claims need not be performed in the order presented.

The various features of the embodiments described herein can be implemented in different systems without departing from the embodiments. It should be noted that the foregoing embodiments are merely examples and are not to be construed as limiting the embodiments. The description of the embodiments is intended to be illustrative, and not to limit the scope of the claims. As such, the described teachings can be readily applied to other types of apparatuses and many alternatives, modifications, and variations will be apparent to those skilled in the art.

What is claimed is:

1. An adjustable seatbelt guide apparatus, comprising:
   a seatbelt guide;
   a mechanical stop;
   the seatbelt guide attached to the mechanical stop; and
   the mechanical stop configured to be moveably secure and adapted to limit reclining movement of a seatback.

2. The apparatus of claim 1, further comprising:
   a motor, the motor configured to move the mechanical stop;
   at least one arm coupled to the mechanical stop; and
   a seatbelt retractor.

3. The apparatus of claim 1, wherein the mechanical stop is a striker.

4. The apparatus of claim 1, wherein the mechanical stop is configured to be movable in a forwards, backwards, sideways, arced, up, down direction or any combination thereof.

5. The apparatus of claim 2, wherein the motor is attached to a vehicle body.

6. The apparatus of claim 1, wherein the mechanical stop is a latch.

7. The apparatus of claim 1, wherein the seatbelt guide is configured to be used for a front, rear, middle, or rear facing vehicle seat.

8. An adjustable seatbelt guide system, comprising:
   a guide, the guide configured to guide a seatbelt webbing;
   a retractor, the retractor configured to receive the seatbelt webbing;

a mechanical stop adapted to limit reclining movement of a seatback, the guide attached to the mechanical stop;

at least one linking member, the at least one linking member attached to the mechanical stop; and a motor, the motor configured to move the at least one linking member.

9. The system of claim 8, further comprising a vertical linking member.

10. The system of claim 8, wherein the motor is configured to receive input from a user's seat adjustment buttons.

11. The system of claim 8, wherein the motor is attached to a vehicle body.

12. The system of claim 8, wherein the mechanical stop is configured to be movably secure in a forwards, backwards, sideways, arced, up, down direction or any combinations thereof.

13. The system of claim 8, wherein the guide is configured to be used for a front, rear, middle, or rear facing vehicle seat.

14. A device for an adjustable seatbelt guide, comprising:
a seatbelt guide; and
a striker, the seatbelt guide attached to the striker, the striker configured to be moveably secure and adapted to limit reclining movement of a seatback.

15. The device of claim 14, wherein the striker is configured to be movably secure in a forwards, backwards, up, down, arced direction or any combinations thereof.

16. The device of claim 14, wherein the seatbelt guide is configured to be used for a rear vehicle seat.

17. The device of claim 14, wherein the seatbelt guide is positioned outboard from a vehicle seat.

18. The device of claim 14, further comprising:
a motor, the motor configured to move the striker;
an arm coupled to the striker, and
a seatbelt retractor.

19. The device of claim 18, wherein the motor is attached to a vehicle body.

* * * * *